United States Patent
Holland et al.

[11] Patent Number: 6,073,181
[45] Date of Patent: Jun. 6, 2000

[54] MULTI-BUFFER ERROR DETECTION FOR AN OPEN DATA-LINK INTERFACE LAN ADAPTER

[75] Inventors: William G. Holland, Cary; Joseph Franklin Logan; Joseph Gerald McDonald, both of Raleigh; Gregory Francis Paussa, Cary, all of N.C.

[73] Assignee: International Business Machines Corporation, Armonk, N.Y.

[21] Appl. No.: 08/868,348

[22] Filed: Jun. 3, 1997

[51] Int. Cl.[7] ............................................. G06F 15/16
[52] U.S. Cl. ...................... 709/250; 709/236; 370/463; 710/52
[58] Field of Search ................. 395/200.64, 200.44, 395/200.66, 200.8, 282, 873, 872, 877; 370/473, 908, 412, 413, 418, 463; 714/710, 798, 735; 709/234, 214, 236, 250; 710/102

[56] References Cited

U.S. PATENT DOCUMENTS

| | | | |
|---|---|---|---|
| 4,516,201 | 5/1985 | Warren et al. ........................... | 709/234 |
| 4,771,391 | 9/1988 | Blasbalg .................................. | 364/514 |
| 4,773,043 | 9/1988 | Kesler ..................................... | 709/246 |
| 4,881,167 | 11/1989 | Sasaki et al. ............................ | 364/200 |
| 5,247,626 | 9/1993 | Firoozmand ............................ | 395/250 |
| 5,289,469 | 2/1994 | Tanaka .................................... | 370/94.1 |
| 5,289,470 | 2/1994 | Chang et al. ........................... | 370/94.1 |
| 5,321,819 | 6/1994 | Szczepanek ............................ | 709/250 |
| 5,367,643 | 11/1994 | Chang et al. ........................... | 395/325 |
| 5,400,326 | 3/1995 | Smith ...................................... | 370/61 |
| 5,410,650 | 4/1995 | Sasaki et al. ............................ | 709/250 |
| 5,412,782 | 5/1995 | Hausman et al. ....................... | 709/250 |
| 5,422,628 | 6/1995 | Rodgers .................................. | 340/573 |
| 5,440,690 | 8/1995 | Rege et al. .............................. | 395/200 |
| 5,442,631 | 8/1995 | Tanaka et al. .......................... | 370/463 |
| 5,448,565 | 9/1995 | Chang et al. ........................ | 370/85.13 |
| 5,488,724 | 1/1996 | Firoozmand ...................... | 395/200.07 |
| 5,524,007 | 6/1996 | White et al. ........................ | 370/85.11 |
| 5,537,417 | 7/1996 | Sharma et al. ......................... | 709/250 |
| 5,541,922 | 7/1996 | Pyhalammi .............................. | 370/82 |
| 5,577,211 | 11/1996 | Annapareddy et al. ................ | 709/250 |
| 5,729,681 | 3/1998 | Aditya et al. ........................... | 709/250 |

OTHER PUBLICATIONS

"Dictionary of PC Hardware and Data Communications Terms", Accessed from http://www.oreilly.com/reference/dictionary, 1996.

*Primary Examiner*—Mark H. Rinehart
*Assistant Examiner*—Marc D. Thompson
*Attorney, Agent, or Firm*—John B. Frisone; Joscelyn G. Cockburn

[57] ABSTRACT

A LAN adapter for transferring data frames from a LAN to memory buffers in a processor in which the LAN driver follows either the ODI or the NDIS specification. The adapter accumulates the frame length and compares this to the storage capacity of the buffer. If the frame length does not exceed the buffer capacity and the LAN driver implements the ODI specification, the adapter will indicate good status to the driver. If the frame length exceeds the buffer capacity the adapter will either send bad status to the ODI driver or reuse the buffer and send no status. If the driver follows NDIS, status is sent at the end of the frame.

18 Claims, 3 Drawing Sheets

MULTI-BUFFER ERROR DETECTION FOR AN OPEN DATA-LINK INTERFACE LAN ADAPTER

BACKGROUND

FIELD OF THE INVENTION

Local Area Network (LAN) adapters are commonly used to attach computer systems to networks such as Ethernet, Token-Ring and FDDI. Most high performance LAN adapters operate as bus master devices on industry standard buses such as ISA, EISA, Micro Channel and PCI. As bus masters, they obtain ownership of the host computer system bus and directly transfer frames in and out of buffers located in main memory using a Direct Memory Access (DMA) process. Device driver software running in the host computer monitors and controls operation of the LAN adapter. A typical system configuration is illustrated in FIG. 1.

The device driver provides an interface between the LAN adapter and other software (hereafter application software) executing in the host computer system. The device driver interacts with the LAN adapter hardware by processing hardware interrupts, reading and writing adapter registers and servicing transmit and receive queues. The device driver interacts with the application software by servicing requests to transmit data onto the network and by forwarding data received from the network to the application software.

The vast majority of LAN adapter device driver software conform to either the Open Data-Link Interface (ODI) specification or the Network Driver Interface Specification (NDIS).

ODI and NDIS define the programming interface between the device driver and the application software. ODI was developed by Novell and is used in Novell's NetWare products, while NDIS was developed by 3 COM and Microsoft and is used in Windows operating systems. In general, bus master LAN adapters copy frames received from the LAN into a chain or linked list of buffers, allocated by the device driver, and resident in the host processor's main memory.

NDIS does not place a limitation on the number of buffers used to store a received frame, and when a received frame exceeds the storage capacity of a buffer, the excess is stored in one or more additional buffers as required and the device driver forwards the frame to the application software. On the other hand, the ODI device driver will not forward any frame which is greater than a single allocated buffer. Frames which exceed the capacity of a single buffer are discarded by the device driver as invalid.

Normally, ODI device drivers will allocate buffers having sufficient capacity to hold the largest frame that it expects to receive. This is determined by negotiation at the time the communication is established. However, under some circumstances (such as operating in a PC DOS environment) buffer sizes somewhat smaller than the maximum size supported by the LAN are selected. In those instances, it is necessary that the device driver perform an explicit check of every received frame to ensure that the buffer contains a complete frame. Otherwise, the device driver could forward a partial frame to the application software. Even though the check rarely fails, it must be done and has an adverse impact on the LAN adapter's performance by lengthening a critical device driver code path.

SUMMARY OF THE INVENTION

An object of the invention is to provide a LAN adapter which will work with device drivers conforming to both the ODI and the NDIS specifications and which will relieve the ODI device driver from the need to check each buffer for receipt of a complete frame.

Another object of the invention is to provide a LAN adapter which will provide with the receipt of each frame, status including an indicia for indicating when a received frame occupies more than a single buffer.

The invention contemplates a LAN adapter for use with LAN drivers following either the ODI or the NDIS specification resident in a host computer and a method for transferring data frames into data buffers controlled by LAN drivers following either the ODI or NDIS specification.

The method is particularly useful in a system including an adapter for receiving data frames received from a Local Area Network (LAN), a system bus connecting the adapter to a memory which includes a plurality of data buffers under control of LAN driver software located in a system main processor and comprises the following steps:

1. receiving the data encoded in frames from said LAN and transferring the received data to a predetermined buffer via the system bus,
2. accumulating the frame length and providing an output indicative of the accumulated frame length when the data frame ends,
3. comparing the output indicative of the received frame length to the size of the predetermined buffer, and
4. sending a status message to the LAN driver via the system bus indicating good status when the comparison indicates that the length of the frame did not exceed the capacity of the predetermined buffer.

DETAILED DESCRIPTION OF THE INVENTION

Figure 1:
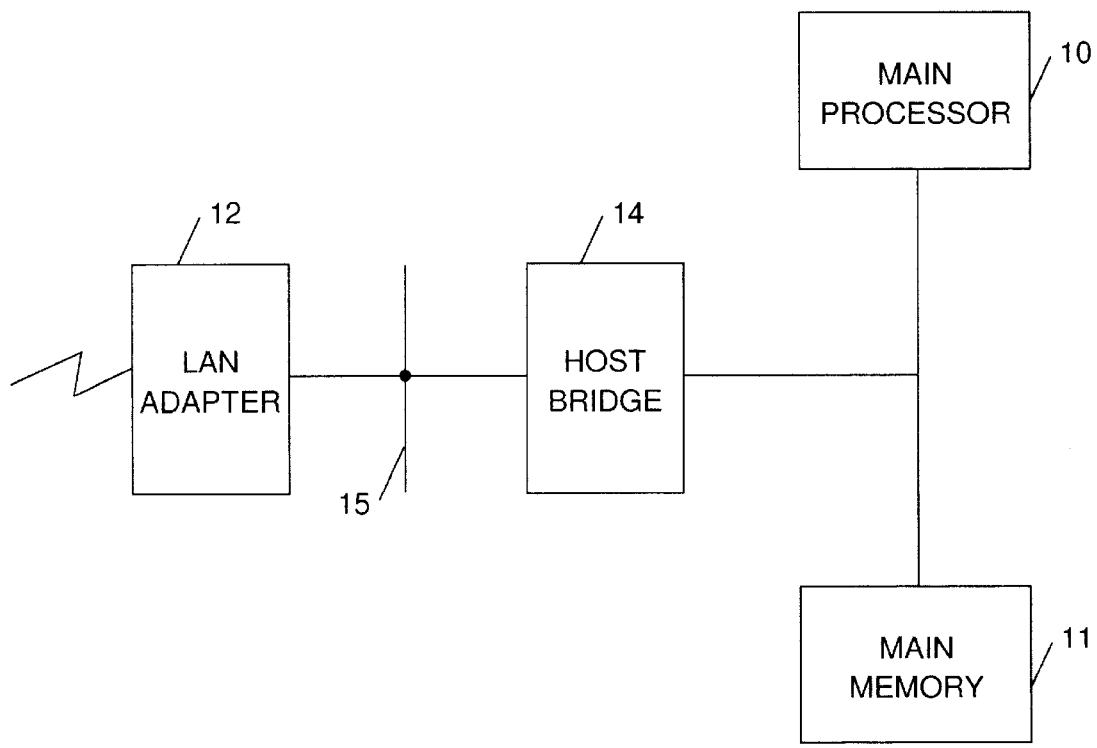
FIG. 1 is a block diagram of a typical system environment in which the invention is used.

In FIG. 1, a host computer system includes a main processor 10 connected directly to a main memory 11 and to a LAN adapter 12 by a host bridge 14 and a system bus 15.

Figure 2:
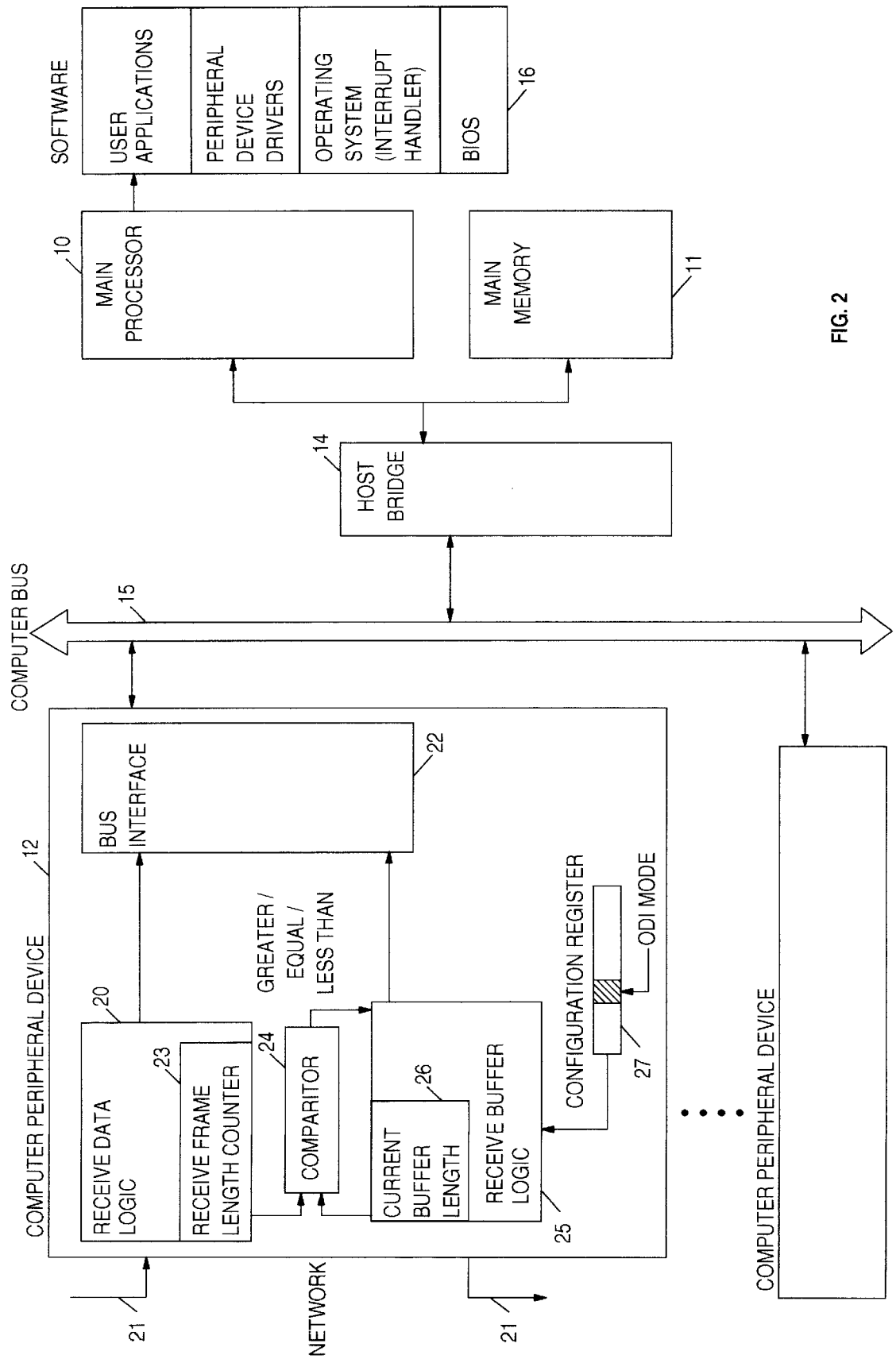
FIG. 2 is a detailed block diagram of a system including a LAN adapter constructed according to the invention.

A more detailed view of this host system is illustrated in FIG. 2. Software 16 resident in the main processor includes an operating system, a BIOS, one or more user applications and one or more peripheral device drivers. The LAN adapter 12 includes receive data logic 20, which receives data from the LAN network 21. The received data is stored in receive buffers via bus interface 22, which transfers the received data across the system bus 15 and the host bridge 14 into one or more buffers in memory 11 which have been allocated by the LAN device driver software running in the main processor.

Receive data logic 20 maintains and updates a receive frame length counter 23. This counter is reset each time a frame starts and is incremented as each data element is received. The count is stopped at the end of the frame and applied to one input of a comparator circuit 24. Receive data logic 20 performs many other well known functions which are not relevant to this invention and will not be described herein.

Receive buffer logic is responsible for managing the buffers allocated by the LAN adapter driver software. It supplies the current buffer length 26 to the other input of comparator 24. Comparator 24 compares the buffer length provided by the receive data logic 20 at the end of a frame to the buffer length provided by the receive buffer logic 25. If the receive frame length exceeds the current buffer length, the comparator 24 provides a first output to receive buffer logic 25 indicating a potential error condition. If the receive frame length is equal to or less than the current buffer length the comparator 24 provides a second output indicating no potential error condition.

Receive buffer logic 25 also receives the output of a configuration register 27. If the ODI mode is not set, receive buffer logic 25 treats both the first and second outputs from comparator 24 only as an end of frame indicator and sends end of frame status to the LAN adapter device driver. However, if the ODI mode is indicated by the state of the configuration register, different status information is sent by the receive buffer logic 25 to the LAN adapter device driver running in the main processor. If the first output is received, error status is sent. If the second output is received, good frame received status is sent. As pointed out above, other conventional functions not described herein may effect the status, and the described status only reflects the impact on the subject matter of this invention.

The LAN adapter 12 can be implemented in hardware, programmed microprocessor or a combination of both. Each has unique advantages and disadvantages. A hardware implementation would provide speed advantage while a programmed micro processor would afford a greater degree of flexibility in design and accommodating future changes in function. However, the logical functions are substantially identical and the flow diagram illustrated in FIG. 3 is applicable to any implementation.

Figure 3:
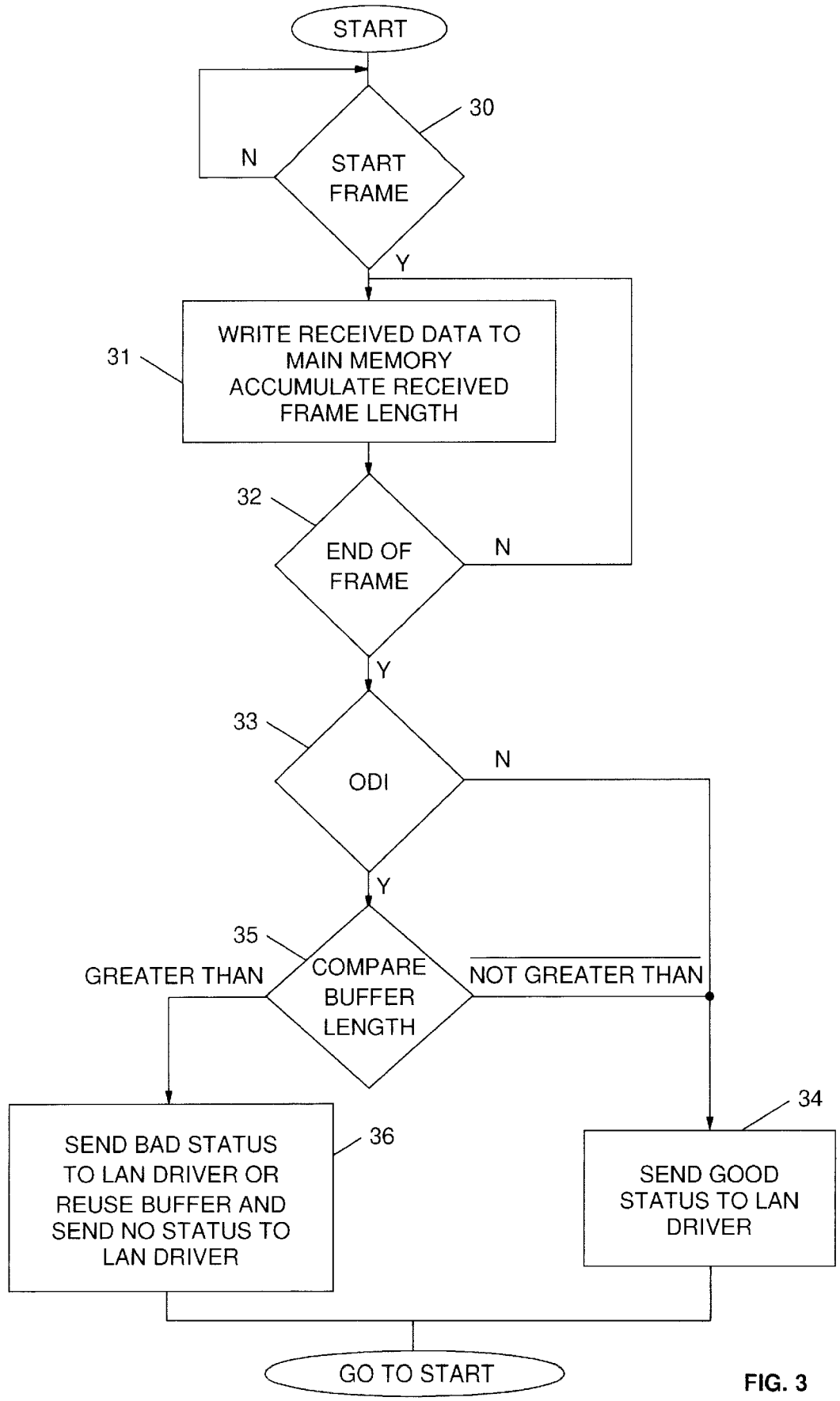
FIG. 3 is a flowchart illustrating the operation of the LAN adapter as it implements the invention.

In FIG. 3 detection of start of frame 30 starts the transfer of received data to the designated buffer in main memory via the DMA process. At the same time, the adapter accumulates the received frame length 31. Until the end of frame is detected 32, the process defined in 31 continues.

Upon detection of the end of frame, the configuration register is checked 33. If the mode is not ODI, the LAN adapter sends good status 34 (along with other status related to other parameters) to the LAN device driver software resident in the main processor and goes to Start.

If the configuration register when checked (33) indicates that the mode is ODI, then the accumulated buffer length is compared to the assigned buffer length 35. If the frame length in not greater than the assigned buffer length, the LAN adapter goes to 34 and sends good status as described above.

If the comparison (35) indicates that the length of the received frame was greater than the capacity of the assigned buffer then it will send bad status to the LAN device driver software resident in the main processor or as an alternative will reuse the buffers and send no status to the LAN driver software 36. Each of the options has its own advantages and disadvantages.

If bad status is sent to the LAN driver, the adapter will use the next available free buffer in the list for storing the next frame received and the LAN device driver will have to manage the control of the list. If the adapter sends no status and reuses the buffers by over writing the prior frame data with new frame data, the LAN driver software is relieved of the buffer management task, however the adapter assumes additional functions related to buffer management. In the case where the buffers are reused by the adapter, no status (of any kind) is sent to the LAN device driver since the driver has no function to perform and the data stored in the buffers will be replaced by data from subsequently received frames.

We claim:

1. In a system including an adapter for receiving data frames received from a Local Area Network (LAN), a system bus connecting the adapter to a memory which includes a plurality of data buffers under control of LAN device driver software located in a system main processor, a method for transferring data frames received from the LAN to the buffers and status information related to said data frames to the LAN device driver software comprising the following steps:

in said adapter;

receiving the data encoded in frames from said LAN and transferring the received data to a predetermined buffer via the system bus, accumulating the frame length and providing an output indicative of the accumulated frame length when the data frame ends, comparing the output indicative of the received frame length to the size of the predetermined buffer, and sending a status message to the LAN device driver software via the system bus indicating good status when the comparison indicates that the length of the frame did not exceed the capacity of the predetermined buffer.

2. The method set forth in claim 1 in which bad status is sent to the LAN device driver software when the received frame length exceeds the storage capacity of the predetermined buffer.

3. The method set forth in claim 1 in which the predetermined buffer is used to store a subsequently received data frame when the comparison indicates that the length of the received frame exceeded the storage capacity of the predetermined buffer.

4. An adapter for transferring data frames received from a Local area Network (LAN) via a system bus to buffers under control of LAN device driver software located in a system main processor and status information related to said data frames to said LAN device driver comprising:

first logic circuitry for receiving data encoded in frames and transferring the received data to a buffer via the system bus;

frame length counter for accumulating the frame length and for providing an output indicative of the accumulated frame length when the data frame ends; and a comparator for comparing the output from the frame length counter to the size of the buffer for receiving the received data; and second logic circuit responsive to signals from said comparator for sending a status message to the LAN device driver software via the system bus indicating good status when the comparison indicates that the length of the frame did not exceed the capacity of the buffer and bad status when the length of the frame exceeds the capacity of the buffer.

5. A dual function adapter for transferring data frames received from a Local Area Network (LAN) via a system bus to buffers under control of LAN device driver software, operating either in accordance with a first specification which requires that a received data frame be stored in a single buffer or in accordance with a second specification which allows data to be stored in multiple buffers, located in a system main processor and status information related to said data frames to said LAN device driver comprising:

first logic circuitry for receiving data encoded in frames and transferring the received data to a buffer via the system bus;

frame length counter for accumulating the frame length and for providing an output indicative of the accumulated frame length when the data frame ends;

selectable configuration register for providing a first or a second output when selected to operate with a LAN driver adhering to the first or second specification, respectively; and second logic circuitry responsive to a first output from the selectable configuration register, for comparing the output from the frame length counter to the size of the buffer for receiving the received data and for sending a status message to the LAN device driver via the system bus indicating good status when the comparison indicates that the length of the frame did not exceed the capacity of the buffer and bad status when the length of the frame exceeds the capacity of the buffer and responsive to a second output from the selectable configuration register for sending good status to the LAN device driver when the output from the frame length counter is received.

6. The dual function adapter set forth in claim 5 in which said first specification conforms to the Open Data-Link Interface (ODI) specification and said second specification conforms to the Network Driver Interface Specification (NDIS).

7. An adapter for transferring data frames received from a Local Area Network (LAN) via a system bus to buffers under control of LAN device driver software located in a system main processor and status information related to said data frames to said LAN driver comprising:

receive data logic for receiving data encoded in frames and transferring the received data to a single buffer via the system bus, for accumulating the frame length and for providing an output indicative of the accumulated frame length when the data frame ends; and receive buffer logic for comparing the output indicative of the receive frame length to the size of the buffer for receiving the received data and for sending a status message to the LAN device driver software via the system bus indicating good status when the comparison indicates that the length of the frame did not exceed the capacity of the single buffer and for reusing the buffers when the comparison indicates that the length of the frame exceeded the single buffer capacity.

8. An adapter for transferring data frames received from a Local Area Network (LAN) via a system bus to buffers under control of LAN device driver software located in a system main processor and status information related to said data frames to said LAN driver comprising:

first logic circuit for receiving data encoded in frames and transferring the received data to a buffer via the system bus;

frame length counter for accumulating the frame length and for providing an output indicative of the accumulated frame length when the data frame ends; and second logic circuit arrangement including a comparator comparing the output from the frame length counter to the size of the single buffer for receiving the received data and logic circuit for generating and sending a status message to the LAN device driver via the system bus indicating good status when the comparison indicates that the length of the frame did not exceed the capacity of the buffer and for reusing the buffers for storing a subsequently received frame when the length of the frame exceeds the capacity of the buffer.

9. A dual function adapter for transferring data frames received from a Local Area Network (LAN) via a system bus to buffers under control of LAN device driver software, operating in accordance with either a first specification which requires that a received data frame be stored in a single buffer or a second specification which has no limit to the number of buffers, located in a system main processor and status information related to said data frames to said LAN device driver comprising:

first logic circuit for receiving data encoded in frames and transferring the received data to a buffer via the system bus;

frame length counter accumulating the frame length and for providing an output indicative of the accumulated frame length when the data frame ends;

selectable configuration register for providing a first or a second output when selected to operate with a LAN device driver adhering to the first or second specification, respectively; and second logic circuit arrangement responsive to a first output from the selectable configuration register, for comparing the output from the frame length counter to the size of the buffer for receiving the received data and for sending a status message to the LAN driver via the system bus indicating good status when the comparison indicates that the length of the frame did not exceed the capacity of the buffer and for reusing the buffers for a subsequently received frame when the length of the frame exceeds the capacity of the buffer and responsive to a second output from the selectable configuration register for sending good status to the LAN device driver when the output from the frame length counter is received.

10. The dual function adapter set forth in claim 9 in which said first specification conforms to the Open Data-Link Interface (ODI) and said second specification conforms to the Network Driver Interface Specification (NDIS).

11. In a system including an adapter for receiving data frames received from a Local Area Network (LAN), a system bus connecting the adapter to a memory which includes a plurality of data buffers under control of LAN device driver software, operating under either a first specification which requires that a received frame be stored in a single buffer or a second specification which has no limit to the number of buffers used, located in a system main processor, a method for transferring data frames received from the LAN to the buffers and status information related to said data frames to the LAN device driver comprising the following steps:

in said adapter;

receiving data encoded in frames and transferring the received data to a buffer via the system bus;

accumulating the frame length and providing an output indicative of the accumulated frame length when the data frame ends;

comparing the accumulated frame length to the size of the buffer for receiving the received data; and sending a status message to the LAN device driver via the system bus indicating good status when the comparison indicates that the length of the frame did not exceed the capacity of the buffer and bad status when the length of the frame exceeds the capacity of the buffer when the LAN device driver follows the first specification and sending good status to the LAN device driver when the frame is received when the LAN driver follows the second specification.

12. The method set forth in claim 11 in which said first specification conforms to the Open Data-Link Interface (ODI) and said second specification conforms to the Network Driver Interface Specification (NDIS).

13. In a system including an adapter for receiving data frames received from a Local Area Network (LAN), a system bus connecting the adapter to a memory which includes a plurality of data buffers under control of LAN device driver software, operating under either a first specification which requires that a received data frame be stored in a single buffer or a second specification which has no limit, located in a system main processor, a method for transferring data frames received from the LAN to the buffers and status information related to said data frames to the LAN device driver software comprising the following steps:

in said adapter;

receiving data encoded in frames and transferring the received data to a buffer via the system bus, accumulating the frame length and providing an output indicative of the accumulated frame length when the data frame ends, comparing the accumulated frame length to the size of the buffer for receiving the data frame, and sending a status message to the LAN driver via the system bus indicating good status when the comparison indicates that the length of the frame did not exceed the capacity of the buffer and reusing the buffers for a subsequently received frame when the length of the frame exceeds the capacity of the buffer when the LAN driver practices said first specification, and sending good status to the LAN driver when the frame is received when the LAN driver practices said second specification.

14. The method set forth in claim 13 in which said first specification conforms to the Open Data-Link Interface (ODI) and said second specification conforms to the Network Driver Interface Specification (NDIS).

15. An adapter comprising:

a first logic circuit arrangement for receiving data encoded in frames and transferring received data over a system bus to a buffer;

frame length counter for accumulating the frame length and for providing an output indicating the accumulated frame length when the data frame ends; and a second logic circuit arrangement including a comparator for comparing an output from the frame length counter to the size of the single buffer receiving the received data and logic circuits responsive to signals from said comparator for generating and sending status messages to a device driver software via the system bus, indicating good status if the comparison indicates that the length of the frame did not exceed the capacity of the single buffer and bad status when the length of the frame exceeds the capacity of the buffer.

16. The adapter of claim 15 further comprising:

a selectable confirmation register including an indicia to be set in a first state if the adapter is to operate in a first mode or to be set in a second state if the adapter is to be set in a second mode.

17. The adapter of claim 16 wherein the first mode includes the Open Data Line Interface (ODI) and the second mode includes the Network Driver Interface Specification (NDIS) mode.

18. The adapter of claim 17 wherein if the adapter is operating in the NDIS mode, the status message sent to said device driver software is an end of message notification.

* * * * *